United States Patent
Pearcy et al.

(10) Patent No.: US 10,366,401 B1
(45) Date of Patent: Jul. 30, 2019

(54) CONTENT PLACEMENT OPTIMIZATION

(75) Inventors: Brandon M. Pearcy, San Francisco, CA (US); Nathan P. Lucash, San Francisco, CA (US)

(73) Assignee: Google LLC, Mountain View, CA (US)

( * ) Notice: Subject to any disclaimer, the term of this patent is extended or adjusted under 35 U.S.C. 154(b) by 905 days.

(21) Appl. No.: 13/537,732

(22) Filed: Jun. 29, 2012

(51) Int. Cl.
*G06Q 30/02* (2012.01)

(52) U.S. Cl.
CPC ......... *G06Q 30/0205* (2013.01); *G06Q 30/02* (2013.01)

(58) Field of Classification Search
USPC .................................................. 705/7.34, 14
See application file for complete search history.

(56) References Cited

U.S. PATENT DOCUMENTS

| | | | |
|---|---|---|---|
| 5,826,031 A | 10/1998 | Nielsen | |
| 5,870,559 A | 2/1999 | Leshem et al. | |
| 6,085,229 A | 7/2000 | Newman et al. | |
| 6,405,223 B1 | 6/2002 | Kelley et al. | |
| 6,605,120 B1 | 8/2003 | Fields et al. | |
| 6,625,803 B1 | 9/2003 | Massena et al. | |
| 6,714,975 B1 * | 3/2004 | Aggarwal | G06Q 30/02 705/14.43 |
| 6,721,922 B1 | 4/2004 | Walters et al. | |
| 6,826,594 B1 | 11/2004 | Pettersen | |
| 6,920,609 B1 | 7/2005 | Manber et al. | |
| 6,934,748 B1 | 8/2005 | Louviere et al. | |
| 7,028,001 B1 | 4/2006 | Muthuswamy et al. | |
| 7,031,932 B1 | 4/2006 | Lipsky et al. | |
| 7,039,599 B2 | 5/2006 | Merriman et al. | |
| 7,047,294 B2 | 5/2006 | Johnson et al. | |
| 7,047,318 B1 | 5/2006 | Svedloff | |
| 7,168,040 B2 | 1/2007 | Yamamoto et al. | |
| 7,194,683 B2 | 3/2007 | Hind et al. | |
| 7,370,036 B2 | 5/2008 | Vedula | |
| 7,376,714 B1 * | 5/2008 | Gerken | G06Q 30/02 709/219 |
| 7,523,087 B1 | 4/2009 | Agarwal et al. | |
| 7,594,189 B1 | 9/2009 | Walker et al. | |
| 7,603,619 B2 | 10/2009 | Baugher | |
| 7,747,602 B2 | 6/2010 | Sampson et al. | |
| 7,895,293 B1 | 2/2011 | Vasilik | |
| 7,895,514 B1 | 2/2011 | Edmunds et al. | |
| 8,165,911 B1 * | 4/2012 | Sanil et al. | 705/7.34 |
| 2001/0039510 A1 * | 11/2001 | Galomb | 705/14 |
| 2002/0042738 A1 | 4/2002 | Srinivasan et al. | |
| 2002/0069255 A1 | 6/2002 | Dinovo | |
| 2002/0129064 A1 | 9/2002 | Guthrie | |
| 2002/0143495 A1 | 10/2002 | Roser | |
| 2002/0165940 A1 | 11/2002 | Kameoka et al. | |
| 2002/0188508 A1 | 12/2002 | Lee et al. | |
| 2003/0097374 A1 | 5/2003 | Himeno | |
| 2003/0131106 A1 | 7/2003 | Kasriel | |

(Continued)

OTHER PUBLICATIONS

Freire et al, "WebViews: Accessing Personalized Web Content and Services." WWW10. ACM, 2001, pp. 576-586.

(Continued)

*Primary Examiner* — Saba Dagnew
(74) *Attorney, Agent, or Firm* — Fish & Richardson P.C.

(57) ABSTRACT

Methods, systems, and apparatus, including computer programs encoded on a computer storage medium, for optimizing the placement of advertisement blocks on a web page.

7 Claims, 6 Drawing Sheets

(56) References Cited

U.S. PATENT DOCUMENTS

| | | | |
|---|---|---|---|
| 2003/0163784 | A1 | 8/2003 | Daniel et al. |
| 2004/0019634 | A1 | 1/2004 | Van Geldern et al. |
| 2004/0107423 | A1 | 6/2004 | Noda |
| 2004/0123247 | A1 | 6/2004 | Wachen et al. |
| 2004/0168122 | A1 | 8/2004 | Kobipalayam |
| 2004/0225562 | A1 | 11/2004 | Turner |
| 2005/0021397 | A1 | 1/2005 | Cui et al. |
| 2005/0034065 | A1 | 2/2005 | Weight |
| 2005/0071745 | A1 | 3/2005 | Ehrich et al. |
| 2005/0071755 | A1 | 3/2005 | Harrington et al. |
| 2005/0071757 | A1 | 3/2005 | Ehrich et al. |
| 2005/0160002 | A1 | 7/2005 | Roetter et al. |
| 2005/0268229 | A1 | 12/2005 | Wessling et al. |
| 2006/0031417 | A1 | 2/2006 | Narin |
| 2006/0036400 | A1 | 2/2006 | Kasriel et al. |
| 2006/0162071 | A1 | 7/2006 | Dixon et al. |
| 2006/0173743 | A1 | 8/2006 | Bollay |
| 2006/0173815 | A1 | 8/2006 | Vedula |
| 2006/0184638 | A1 | 8/2006 | Chua et al. |
| 2006/0218490 | A1 | 9/2006 | Fink |
| 2006/0265400 | A1 | 11/2006 | Fain et al. |
| 2006/0271671 | A1 | 11/2006 | Hansen |
| 2006/0293951 | A1 | 12/2006 | Patel et al. |
| 2007/0027754 | A1 | 2/2007 | Collins et al. |
| 2007/0061700 | A1 | 3/2007 | Kothari et al. |
| 2007/0100956 | A1 | 5/2007 | Kumar |
| 2007/0124671 | A1 | 5/2007 | Hackworth et al. |
| 2007/0130510 | A1 | 6/2007 | Dharamshi et al. |
| 2007/0136255 | A1 | 6/2007 | Rizzo et al. |
| 2007/0143672 | A1 | 6/2007 | Lipton et al. |
| 2007/0150353 | A1 | 6/2007 | Krassner et al. |
| 2007/0271352 | A1 | 11/2007 | Khopkar et al. |
| 2007/0271501 | A1 | 11/2007 | Vasilik |
| 2007/0271511 | A1 | 11/2007 | Khopkar et al. |
| 2007/0276813 | A1 | 11/2007 | Rosen |
| 2007/0299985 | A1 | 12/2007 | Craig et al. |
| 2008/0028334 | A1 | 1/2008 | De Mes |
| 2008/0046415 | A1 | 2/2008 | Henkin et al. |
| 2008/0046507 | A1 | 2/2008 | Westphal |
| 2008/0133722 | A1 | 6/2008 | Ramasundaram et al. |
| 2008/0262912 | A1* | 10/2008 | Gargi ............ G06Q 30/0241 705/14.4 |
| 2008/0276266 | A1* | 11/2008 | Huchital ............ G06Q 30/02 725/32 |
| 2009/0006192 | A1 | 1/2009 | Martinez et al. |
| 2009/0150253 | A1 | 6/2009 | Williams et al. |
| 2009/0204579 | A1 | 8/2009 | Govani et al. |
| 2009/0241015 | A1 | 9/2009 | Bender et al. |
| 2009/0300483 | A1 | 12/2009 | Viet |
| 2010/0198694 | A1* | 8/2010 | Muthukrishnan .. G06Q 30/0275 705/14.71 |
| 2011/0213676 | A1 | 9/2011 | Singh et al. |
| 2011/0276411 | A1 | 11/2011 | McElfresh et al. |

OTHER PUBLICATIONS

Han et al., "WebSplitter: A Unified XML Framework for Multi-Device Collaborative Web Browsing." CSCW'00. ACM, 2000, pp. 221-230.
'WayBack Machine' [online]. "HTML Tutorial-Attributes," in: http://tizag.com/thmIT/htmlattributes.php, Dec. 22, 2007, [retrieved on Nov. 6, 2011]. Retrieved from the Internet: <URL: http://web.archive.org/web/20081007121302/http://tizag.com/thmIT/htmlattributes.php>. 4 pages.
Snapshot from Apr. 16, 2003, howstuffworks.com, Brain, Marshall, "How Internet Cookies Work," [online]. Retrieved from the Internet URL: http://web.archive.org/web/20030416025353/http://computer.howstuffworks.com/cookie3.htm, 2 pages.
"ProHTML ticker, Dynamic Drive," Archived Jan. 1, 2005, [online]; Retrieved from the Internet URL: http://www.dynamicdrive.com/dynamicindex2/prohtmlticker.htm, 2 pages.
Raggett et al., "HTML 4.01 Specification, W3C Recommendation," [online] [retrieved on Dec. 24, 1999]; Retrieved from the Internet URL: http://www.w3.org/TR/1999/REC-html401-19991224, 389 pages.
Snapshot from Oct. 29, 2005, Kefta—Solutions—Customer Acquisition, "Customer Acquisition—drive more customers with greater efficiency," [online]. Retrieved from the Internet URL: http://web.archive.org/web/20051029081141/www.kefta.com/optimization-solutions/customeracquisition.html, 3 pages.
Snapshot from Apr. 27, 2006, Kefta's Dynamic Targeting Solution, "It's about creating a meaningful and relevant experience for your visitors", [online]. Retrieved from the Internet URL: http://web.archive.org/web/20060427125859/www.kefta.com/overview/approach.html, 2 pages.
Snapshot from Apr. 27, 2006, Kefta—Dynamic Targeting—the next generation of website personalization, "At Kefta, we believe in delivering the best message at the best time", [online]. Retrieved from the Internet URL: http://web.archive.org/web/20060427132429/www.kefta.com/overview/index.html, 2 pages.
Snapshot from Apr. 24, 2006, Offermatica: General A/B Test Demo, "What is Offermatica?", [online]. Retrieved from the Internet URL: http://web.archive.org/web/20060422201155/www.offermatica.com/demos/ab.html, 7 pages.
Snapshot from Apr. 24, 2006, Offermatica: Hosted A/B testing, multivariate testing, and landing page optimization tools, "What is Offermatica?", [online]. Retrieved from the Internet URL: http://web.archive.org/web/20060422201114/www.offermatica.com/whatis-1.0.html, 2 pages.
Snapshot from Apr. 24, 2006, Offermatica: How it Works, [online]. Retrieved from the Internet URL: http://web.archive.org/web/20060428054148/www.offermatica.com/whatis-1.1.1.html, 1 page.
Snapshot from Apr. 28, 2006, Optimost: Improve conversion rates on any landing page, splash page, jump page, "Maximize Conversion Rates Increase Your Revenue", [online]. Retrieved from the Internet URL: http://web.archive.org/web/20060425212837/www.optimost.com/, 1 page.
Snapshot from Apr. 23, 2006, Touch Clarity—Technology, "Control Groups", [online]. Retrieved from the Internet URL: http://web.archive.org/web/20060503215906/www.touchclarity.com/technology/detail.php?id=78, 1 page.
Snapshot from Apr. 23, 2006, Touch Clarity—Technology, "Targeting Engine", [online]. Retrieved from the Internet URL: http://web.archive.org/web/20060503215705/www.touchclarity.com/technology/detail.php?id=76, 1 page.
Snapshot from Apr. 23, 2006, Touch Clarity—Technology, "Implementation", [online]. Retrieved from the Internet URL: http://web.archive.org/web/20060503215833/www.touchclarity.com/technology/detail.php?id=80, 1 page.
Snapshot from Apr. 23, 2006, Touch Clarity—Technology, "Visitor Profiling", [online]. Retrieved from the Internet URL: http://web.archive.org/web/20060503215758/www.touchclarity.com/technology/detail.php?id=77, 1 page.
DeGroot, "Onmouseover div swap gives flickering effect," webmaster-talk, Jan. 18, 2008, 3 pages.
JavaScript Kit, "Conditional Compilation of Jscript/ JavaScript in IE," 1997-2008, 2 pages.
Vasilik, "Advanced Experiment Techniques", Google Website Optimizer WOAC Summit '08, Nov. 11, 2008, 10 pages.
WayBack Machine' [online]. "Writing HTML, 27b. JavaScript-Dynamic Content," in: http://www.mcli.dist.maricopa.edu/tut.tut27b.html, Dec. 22, 2007, [retrieved on Nov. 6, 2011]. Retrieved from the Internet: <URL: http://web.archive.org/web/20081013220058/http://www.mcli.dist.maricopa.edu/tut/tut27b.html>. 8 pages.
'StackOverflow' [online]. "JavaScript—controlling the insertion point for document.write," original post—Oct. 8, 2009, [retrieved on Nov. 6, 2011]. Retrieved from the Internet: <URL: http://stackoverflow.com/questions/1536970/javascript-controlling-the-insertion-point-for-document-write>. 3 pages.
Song et al., Learning Block Imporance Models for Web Pages, ACM 2004, pp. 203-211.
Ahuja et al., Perceived Disorientation: An Examination of a New Measure to Access Web Design Effectiveness, Google 2001, pp. 15-29.

(56) References Cited

OTHER PUBLICATIONS

Mulvenna et al., Personalization on the Net using Web Mining, ACM 2000, pp. 122-125.

* cited by examiner

CONTENT PLACEMENT OPTIMIZATION

BACKGROUND

This specification relates to a process for optimizing the placement of content blocks for displaying content in a resource.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be embodied in methods that include the actions of receiving an advertisement request for a resource displayed at a user device, the advertisement request including data describing: advertisement blocks available for display in the resource, each advertisement block being an available location in which one or more advertisements may be displayed, for each advertisement block, one or more advertisement slots in the advertisement block, each advertisement slot being a location in which an advertisement may be displayed; selecting one set of a plurality of sets of advertisement blocks, each set of advertisement blocks specifying a set of one or more advertisement blocks in the resource that are enabled, and wherein at least one of the sets of advertisement blocks is different from the other sets of advertisement blocks; providing advertisements for only the advertisement slots in the respective advertisement blocks of the selected set of advertisement blocks; receiving performance data describing a performance of the selected set of advertisement blocks at the user device; and updating a performance metric for the selected set advertisement blocks based on the performance data. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Performance for multiple sets of content blocks for a resource can be tracked using one version of the resource. A top-performing set of content blocks can be determined for a resource and subsequent received content items can be presented in the top-performing set of content blocks, with the determination and the presentation occurring without any action required of the publisher of the resource. Dynamic changes in performance over time can be monitored, and different sets of content blocks can be selected to optimize performance in response to the changes. Such changes may be due to seasonality, changes in user behavior, etc.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
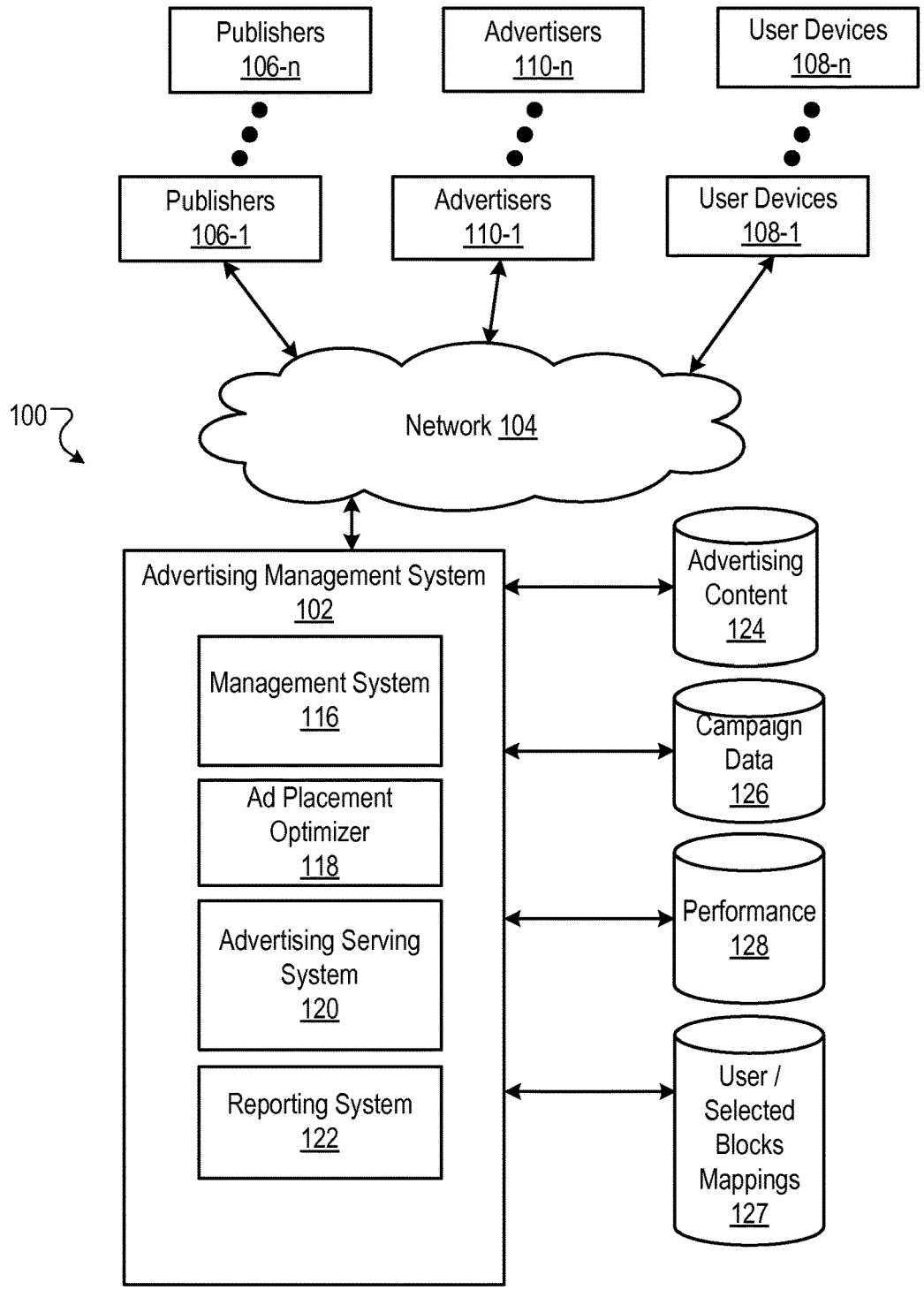
FIG. 1 is a block diagram of an example online content item provisioning environment.

Resources can be rendered with content provided from different providers. For example, a resource publisher may publish a resource that includes content authored by the provider and other content items that are displayed in one or more separate content blocks. For example, the other content items may be video clips, images, text. One type of content item that is often shown is an advertisement. Often a publisher arranges for advertisements to be shown in one or more advertising blocks on the publisher's web page. Each block may include one or more advertisements. In the description that follows, the subject matter regarding the content items and content blocks is described in the context of advertisements and advertisement blocks. However, the subject matter of this application can realize placement optimization for any type of content item shown in specific content blocks, and thus the subject matter of this application is not limited to advertisements and advertisement blocks.

Website publishers have a very difficult task when it comes to optimizing content block placement. Simply adding more content items and content blocks can actually hurt overall performance with respect to selection of the content items. Similarly, relocating content blocks can improve or hurt performance based on a large number of factors.

The process of this application automates the entire placement optimization process. In some implementations, a publisher labels a web page with all content blocks. The labeling can, in some implementations, specify combinations of acceptable content blocks (e.g., header and left pane, header and right pane, but not right and left pane, etc.). Alternatively, any combination can be selected if the publisher does not specify combinations. For each set of advertisement blocks, selection optimization heuristics can be used to select particular sets. For example, selections can be based on omitting one advertisement block at a time, or showing just one ad block at a time, etc.

An advertisement request received at an ad server can specify the advertisement blocks in a web page. The ad server can divert a balanced fraction of users through each configuration, can track cumulative ad performance for each of the variations, and can gradually divert more and more users to the known best configuration.

In some implementations, a user's cookie ID or other user identifier is associated with a particular configuration for a particular page. Pages can be associated with cookie IDs in a dynamic way such that an amount of traffic going to each configuration is adjusted based on the probability that a configuration is the best configuration for a particular page. Poorly performing configurations can thus receive a smaller percentage of users. This approach provides an acceptable mix of exploration (e.g., trying configurations with a neutral or low probability of being the best) and exploitation (e.g., sending the majority of users to the best performing configuration).

FIG. 1 is a block diagram of an example online advertising environment 100. The online advertising environment 100 utilizes an advertising management system 102 to facilitate the sale and purchase of online advertising opportunities between publishers and advertisers.

The online advertising environment 100 includes a computer network 104, such as a local area network (LAN), wide area network (WAN), the Internet, or a combination thereof, connecting publishers 106, user client devices 108, advertisers 110, and the advertising management system 102. The advertising management system 102 further has access to an advertising content store 124, a campaign data store 126, a user/selected blocks mappings store 127, and a performance store 128.

Each publisher 106 is associated with one or more publisher websites (e.g., each respective publisher 106 can be an entity that manages and/or owns one or more websites). Each publisher website can have one or more webpage resources associated with a domain name, and can be hosted by one or more servers. An example website is a collection of webpages formatted in hypertext markup language (HTML) that can contain text, images, multimedia content, and programming elements.

User client devices 108 are electronic devices that are under the control of users. A user client device 108 typically includes a user application, such as a web browser, to facilitate the sending and receiving of data over the network 104.

The advertising management system 102 facilitates the sale and purchase of advertising opportunities between publishers 106 and advertisers 110. The advertising management system 102 includes components, such as a management system 116, an ad placement optimizer 118, an advertising serving system 120, and a reporting system 122. An advertiser can create an advertising campaign using tools provided by the management system 116.

The management system 116 provides user interfaces for advertisers to define advertising campaigns and ad groups, submit advertising content, and specify various selection and/or ad placement criteria for the advertising content in each advertising campaign and/or ad group. The advertising content is stored in the advertising content store 124 and the selection and ad placement criteria are stored in the campaign data store 126. For each ad group or campaign, the advertisers can also specify bids for ad slots associated with particular keywords through the interface provided by the management system 116. Advertisers' bids, budgets, as well as other campaign related preferences are also stored in the campaign data store 126.

An account management tool can be employed by an advertiser to create and manage a large number of online advertising campaigns for various products and services that the advertiser offers. The account management tool can be made available to the advertiser either through an online interface provided by the management system 116 or as an account management software application installed and executed locally at an advertiser's client device. The online interface and/or the locally executed account management software application can be used for downloading existing account data from the management system 116 and for uploading new and/or modified account data to the management system 116.

The advertiser can create and manage multiple advertising campaigns using the account management tool offered by the management system 116. The advertiser can further specify multiple ad groups under each ad campaign, and specify respective advertisements, budgets, keywords, and other selection and/or ad placement criteria for each of the ad groups. Typically, the advertising account can be abstracted into a hierarchical structure. For example, the advertising account can include one or more ad campaigns, each ad campaign can include one or more ad groups, and each ad group can include one or more advertisements and keywords.

An advertising campaign is defined by campaign level advertising parameters. The campaign level advertising parameters include, for example, a campaign name, a preferred content network for placing ads, a budget for the ad campaign, start and end dates for the ad campaign, a schedule for ad placements, a particular language, and selected geographical locations. Other campaign level advertising parameters includes, for example, a payment scheme such as a cost-per-click (CPC), cost per thousand impressions (CPM), cost-per-action (CPA), and so on.

The ad campaign includes one or more ad groups. An ad group contains one or more advertisements, which are associated with a particular set of keywords, ad placements, or both. Ad groups under the same campaign can share the same campaign level advertising parameters, but have tailored specifications for particular ad group level advertising parameters, such as keywords, bids for keywords, budget, and so on.

Different ad groups are created to be focused on different product lines or services. For example, different sets of keywords specific to the different product lines or services can be used for the different ad groups. Sometimes, different ad groups can also be focused on different market segments and/or demographic characteristics. Keywords specific for the different market segments and/or demographic characteristics can be included in the different ad groups.

An ad group is defined by ad group level advertising parameters. The ad group level advertising parameters include, for example, an ad group name, and various bids for different ad placement opportunities (e.g., automatic placement, advertiser managed placement, etc.) or outcomes (e.g., clicks, impressions, conversions). An ad group name can be one or more terms that the user can use to concisely capture a topic or subject matter that the ad group corresponds to. For example, a car dealership can create a different ad group for each type of vehicles it carries, and may further create a different ad group for each model of vehicles it carries. Examples of the ad group themes that the car dealership can use include, for example, "sports car," "sedan," "truck," "hybrid," and so on.

One or more keywords and advertisements are specified for each ad group. The keywords are typically terms that are relevant to the product or services that the user wishes to promote for the ad group. Each keyword can include one or more terms. For example, the car dealership may include "automobile", "sports car," "V-6 engine," "four-wheel drive," "fuel efficiency," and so on as keywords for its ad groups and ad campaigns. The advertiser can also specify whether exact match of keywords are required for ad placements on the content network.

In addition to keywords, for each ad group, a number of advertisements for selection by the ad server when an advertising opportunity becomes available that matches the budget, ad schedule, maximum bids, keywords, and other selection criteria are specified. Different types of ads can be included in an ad group, such as a text ad, an image ad, a local business ad, a mobile ad, and so on.

Other aspects of the ad group can be defined in terms of various advertising parameters and specified by user-entered values or default values for those various advertising parameters. After all the required advertising parameters for each level and aspect of the ad campaign(s) are specified, the advertising campaign data (e.g., data including the campaign structure and the advertising parameters on each level within the campaign structure) are uploaded to the management system 116, and the data are persisted to the campaign data store 126. The advertising campaign can be created and activated according to the advertising campaign data specified by the advertiser.

The advertising management system 102 provides an interface for publishers 106 to specify ad slots available on the publisher's online properties. For example, the publishers 106 can specify the cost, type, dimensions, and selection criteria (e.g., keywords associated with the content of the online properties) for each ad slot. A publisher management server (not shown) can provide scripts or references to scripts to the publishers 106 according to the specifications of the ad slots. Each publisher 106 can insert instructions into its webpages or content items (e.g., RSS feeds, social networks, videos, etc.). The publishers 106 can identify blocks of advertisement slots (e.g., advertisement blocks) on a web page and can identify sets of advertisement blocks that are acceptable to the publisher for presentations of advertisements on the web page. For example, the publishers can specify that it is acceptable to present ads in both a header advertisement block and a footer advertisement block but that it is not acceptable to present advertisements in both the header advertisement block and a center advertisement block that is inline with content of the web page.

When the web pages and content items are downloaded to user client devices 108, the instructions are executed to generate one or more ad requests to the advertising management system 102. The ad requests are optionally associated with user characteristics (e.g., a user's age, gender, income, language preferences, and so on) and advertising context (e.g., keywords associated with web page content, location, local time of ad request, and so on). The ad requests can include a user identifier (e.g., a cookie). In some implementations, various user privacy measures are implemented to remove personally identifiable information from the user characteristics data.

In some implementations, an ad request is a consolidated ad request. For example, an ad request can be a single request for a web page that describes all advertisement blocks that are available for display in the web page, with each advertisement block being an available location in which one or more advertisements may be displayed on the web page. The data describing an advertisement block can include data that describes the location of the advertisement block and also data that describes one or more advertisement slots that are included in the advertisement block, where each advertisement slot is a location in the advertisement block in which an advertisement may be displayed.

In response to the ad request, the ad placement optimizer 118 can select a set of advertisement blocks from among a plurality of possible sets of advertisement blocks. Each set of advertisement blocks can specify one or more advertisement blocks that are enabled for displaying one or more ads in the web page. The ad placement optimizer 118 can, for example, randomly select a set of advertisement blocks. As discussed in more detail below, the ad placement optimizer 118 can use other approaches to select a set, such as selecting sets in proportion to the value(s) of one or more performance metrics that are associated with each set. If the ad request includes a user identifier, the ad placement optimizer 118 can associate the selected set with the user identifier and store the association in the user/selected-blocks mappings store 127. The set selected for the user can be selected for subsequent ad requests received for the user (e.g., to maintain a consistent user experience for the user).

The advertising serving system 120 can respond to the ad request by sending advertisements to the requesting user client device 108 for insertion into appropriate advertisement slots of the advertisement blocks that are specified by the selected set of advertisement blocks. The advertising serving system 120 can select advertisements from the advertising content store 124 for each ad request based on a match between an advertiser's campaign criteria in the campaign data store 126 and the user characteristics and advertising context associated with the ad request. The advertisements can include embedded links to landing pages (e.g., webpages on the advertisers' websites 110) that a user is directed to when the user clicks on the advertisements presented on the publisher's webpages or in the content items.

The advertisements provided after a successful match, and optionally user responses (e.g., click-throughs, conversions, and so on) to the advertisements, can be monitored by various monitoring mechanisms (e.g., monitoring cookies, pixel callbacks, etc.), sent back to the advertising management system 102, and stored in the performance store 128. The monitoring can be enabled by various user opt-in processes. One or more performance metrics (e.g., click-through rate, conversion rate) can be stored in the performance store 128 for a web page for each of one or more sets of advertisement blocks that have been selected for the web page. The ad placement optimizer 118 can determine whether a performance metric for a set of advertisement blocks for a web page meets an exploitation threshold. If the performance metric for the set meets the exploitation threshold, the ad placement optimizer 118 can select the set for substantially all subsequent ad requests received for the web page.

The reporting system 122 provides user interfaces for advertisers and publishers to review reports on the campaign statistics in various formats. Performance of particular keywords, ad groups, sets of advertisement blocks, and campaigns can be measured based on various performance metrics, such as cost per action (e.g., click or conversion), conversion length (e.g., number of clicks between initial impression and conversion), and so on.

Figure 2:
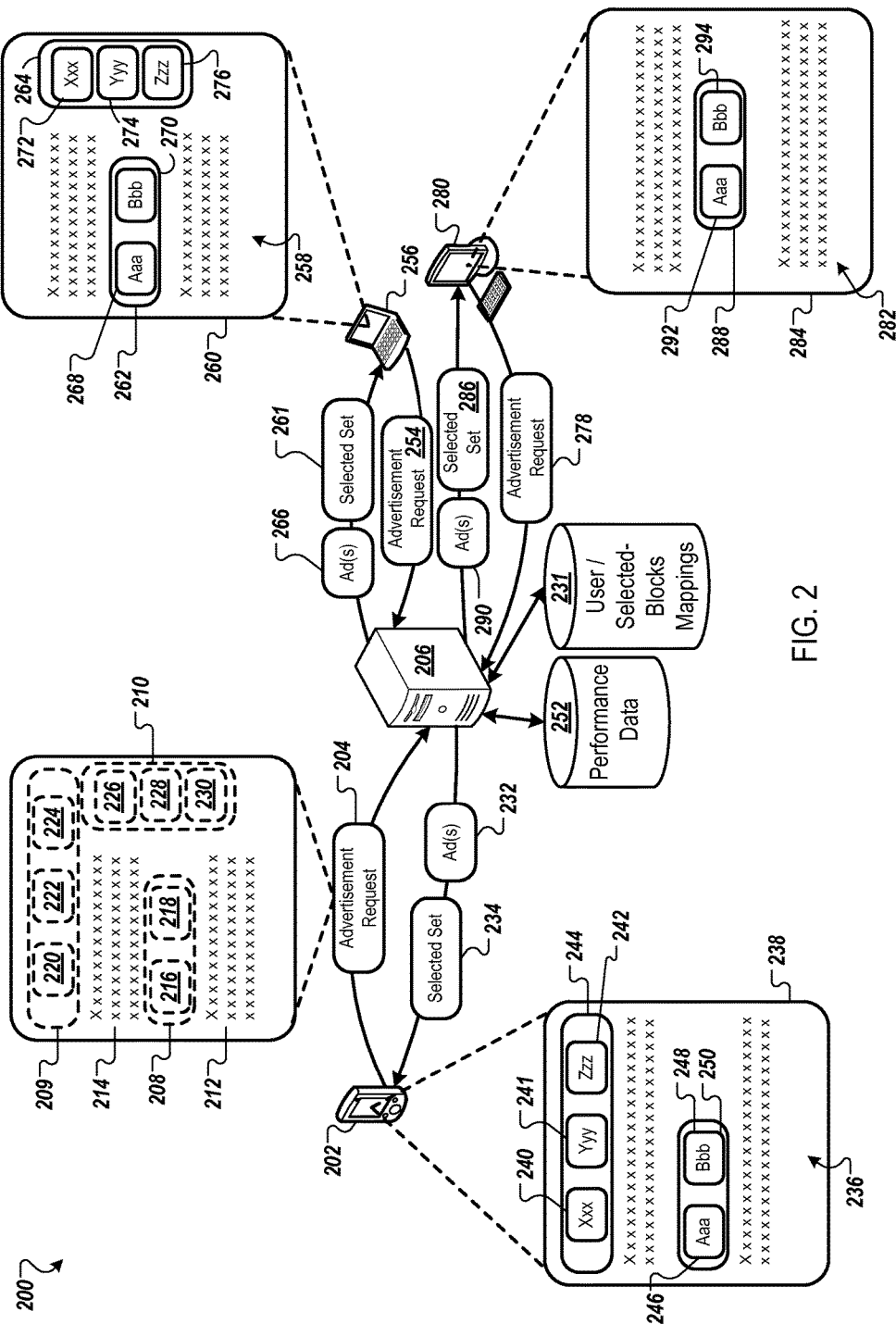
FIGS. 2 and 3 are block diagrams of example systems for optimizing the placement of content blocks on a resource.

FIG. 2 is a block diagram of an example system 200 for optimizing the placement of advertisement blocks on a resource (e.g., a web page). A user device 202 can send an advertisement request 204 for a resource to an advertisement management system 206. The advertisement request 204 can include, for example, a user identifier that is uniquely associated with a user of the user device 202. The advertisement request 204 can also include data that describes one or more advertisement blocks that are available for display in the resource. For example, the advertisement request 204 can include data that describes advertisement blocks 208, 209 and 210. The advertisement block 208 can be a middle advertisement block that is displayed above content 212 and below content 214. The advertisement block 209 can be a top advertisement block that is displayed above the content 214 and the advertisement block 210 can be a right advertisement block that is displayed to the right of the content 212, the advertisement block 208, and the content 214.

Each advertisement block 208, 209, and 210 can be an available location in which one or more advertisements may be displayed. For example, each advertisement block 208, 209, and 210 may include one or more advertisement slots, where each advertisement slot is a location in which an advertisement may be displayed. For example, the advertisement block 208 includes advertisement slots 216 and 218, the advertisement block 209 includes advertisement slots 220, 222, and 224, and the advertisement block 210 includes advertisement slots 226, 228, and 230. The advertisement request 204 can include data which describes the locations of the advertisement blocks 208, 209, 210, relative to the resource and to the content 212 and 214. The advertisement request 204 can also include data which describes that the advertisement slots 216-218, 220-224, and 226-230 are included in the advertisement blocks 208, 209, and 210, respectively.

In general, data included in the advertisement request 204 can describe locations of the resource which the publisher of the resource considers acceptable locations for displaying advertisements. A location can be described in a variety of ways. A location can be described, for example, as a position within the resource (e.g., a location of a lower left of an advertisement block can be defined relative to the lower left of the resource). As another example, an advertisement block location can be described using one or more descriptive labels (e.g., "header_block" (e.g., the advertisement block 209), "right_block" (e.g., the advertisement block 210), "center_block" (e.g., the advertisement block 209), "footer_block", "left_block", etc.). If descriptive labels are used, the advertisement request 204 can include one or more descriptive labels which respectively indicate one or more acceptable locations (e.g., the advertisement request 204 can include the descriptive labels "header_block", "center_block", and "right_block").

In some implementations, the advertisement request 204 can include one or more positive or negative indicators (e.g., for some or all descriptive labels or for other location information), where a positive indicator indicates an acceptable location and a negative indicator indicates an unacceptable location. For example, "+footer_block" can indicate that an advertisement block at the bottom of the resource is acceptable and "−left_block" can indicate that an advertisement block at the left of the resource is unacceptable. In some implementations, the advertisement request 204 can be defined using only positive indicators (e.g., the advertisement request 204 can include only descriptions of acceptable locations and the advertisement management system 206 can assume that other locations are not acceptable), using only negative indicators (e.g., the advertisement request 204 can include only descriptions of unacceptable locations and the advertisement management system 206 can assume that other locations are acceptable), or using a combination of positive and negative indicators. For example, the advertisement request 204 can include any of the following combinations of descriptive labels and indicators: {"+header_block", "+center_block", "+right_block", "−footer_block", "−left_block"} (e.g., using both positive and negative indicators); {"+header_block", "+center_block", "+right_block"} (e.g., using only positive indicators); or {"−footer_block", "−left_block"} (e.g., using only negative indicators). The indicators can be specified by the publisher.

In response to receiving the advertisement request 204, the advertisement management system 206 can select a set of one or more advertisement blocks. The set of advertisement blocks can be selected from a plurality of possible sets of advertisement blocks. For instance, for the example advertisement request 204 that includes descriptions of the advertisement blocks 208, 209, and 210, the advertisement management system 206 can select one of the following sets: 1) the advertisement block 208; 2) the advertisement block 209; 3) the advertisement block 210; 4) the advertisement blocks 208 and 209; 5) the advertisement blocks 208 and 210; or 6) the advertisement blocks 209 and 210. In general, various approaches can be used to select the set of advertisement blocks. For example, one block can be selected, all but one block can be selected, or some other combination of blocks can be selected. In some implementations, a set is selected randomly. As described in more detail below, a set can be selected based on performance information associated with the plurality of sets of advertisement blocks.

In some implementations, the advertisement management system 206 determines whether the advertisement request 204 includes a user identifier and if so, whether the user identifier is associated with a set of advertisement blocks. For example, once a set of advertisement blocks has been presented to a user, a user identifier of the user can be associated with the presented set so that the same set of advertisement blocks is presented to the user for each request by the user for the resource, for maintaining a consistent user experience. If the user identifier is associated with a set of advertisement blocks, the advertisement management system 206 can select the set of advertisement blocks that is associated with the user identifier. If the user identifier is not associated with a set of advertisement blocks, the advertisement management system 206 can select a set of advertisement blocks, such as using a selection approach as described above, and can associate the selected set with the user identifier, such that the selected set is also selected for subsequent requests for the resource that include the user identifier. The association between the user identifier and the selected block can be stored, for example, in a user/selected-blocks mappings data store 231.

As illustrated by provided advertisements 232, the advertisement management system 206 can provide advertisements for the advertisement slots in the respective advertisement blocks of the selected set of advertisement blocks to the user device 202, in response to the advertisement request 204. As illustrated by a selected set indicator 234, the advertisement management system 206 can provide an indication of the selected set of advertisement blocks. As illustrated in a resource 236 presented on a user interface 238, the provided advertisements 232 can be presented on the user device 202 in the respective advertisement blocks corresponding to the selected set indicator 234. For example, the selected set indicator 234 may indicate that the selected set of advertisement blocks includes the advertisement blocks 208 and 209 (e.g., and not the advertisement block 210).

As illustrated in the resource 236, respective advertisements may be presented, for example, in respective advertisement slots 240, 241, and 242 in an advertisement block 244 (e.g., corresponding to the advertisement slots 220, 222, and 224 included in the advertisement block 209 that are each described in the advertisement request 204). As another example, respective advertisements may be presented in respective advertisement slots 246 and 248 in an advertisement block 250 (e.g., corresponding to the advertisement slots 216 and 218 included in the advertisement block 208 that are each described in the advertisement request 204).

The advertisement management system 206 can receive performance data that describes a performance of the selected set of advertisement blocks at the user device 202. For example, indications of selections (e.g., clicks) of advertisements displayed in any of the advertisement slots 240-242 or 246-248 can be received. As another example, conversions (e.g., purchases) associated with any of the advertisement slots 240-242 or 246-248 can be received.

In response to receiving the performance data, the advertisement management system 206 can update one or more performance metrics associated with the selected set of advertisement blocks, based on the performance data. The performance metrics can be stored, for example, in a performance data store 252. In some implementations, the advertisement management system 206 can select sets of advertisement blocks in response to advertisement requests in proportion to a performance metric for each set of advertisement blocks. For example, suppose that the set of advertisement blocks that includes the advertisement blocks 208 and 209 is a second highest performing set of advertisement blocks. Suppose also that a set of advertisement blocks that includes the advertisement blocks 208 and 210 is a highest performing set of advertisement blocks. In such an example, the advertisement management system 206 can more frequently select the set that includes the advertisement blocks 208 and 210 than the set that includes the advertisement blocks 208 and 209, for received advertisement requests.

For example, the advertisement management system 206 can receive an advertisement request 254 from a user device 256 for advertisements to be presented with a resource 258 on a user interface 260. As illustrated by a selected set indicator 261 and advertisement blocks 262 and 264, the advertisement management system 206 can select a set of advertisement blocks that includes the advertisement blocks 208 and 210. The advertisement management system 206 can provide advertisements 266 for advertisement slots 268-276 (e.g., corresponding to the advertisement slots 216-218 and 226-230, respectively). The advertisements 266 do not include advertisements for the advertisement slots 220, 222, or 224 (e.g., corresponding to the advertisement block 208 that is not included in the selected set of advertisement blocks).

In some implementations, the publisher of the resource 258 can configure the resource 258 such that alternative content is displayed in a location of the resource corresponding to the unselected advertisement block 208. In other implementations, a content area of the resource 258 that is associated with the advertisement block 208 is hidden (e.g., a size of the content area can be changed to correspond to a height and/or width of zero, or some other approach can be used to made the content area invisible).

In some implementations, the advertisement management system 206 can determine that a performance metric for one of the sets of advertisement blocks for a resource meets an exploitation threshold. For example, one set of advertisement blocks may generally perform better than other sets of advertisement blocks. In response to determining that the performance metric for the top performing set of advertisement blocks meets the exploitation threshold, the advertisement management system 206 can select the top performing set for substantially all subsequent advertisement requests for the resource.

For example, the advertisement management system 206 can determine that a performance metric for a set of advertisement blocks that includes only the advertisement block 208 meets an exploitation threshold. After such a determination, the advertisement management system 206 can, in response to receiving an advertisement request 278 from a user device 280 for advertisements to be presented with a resource 282 on a user interface 284, select the set of advertisement blocks that only includes the advertisement block 208, as illustrated by a selected set indicator 286 and an advertisement block 288. Ads 290 provided to the user device 280 can be presented in advertisement slots 292 and 294 that correspond to the advertisement slots 216 and 218, respectively.

Figure 3:
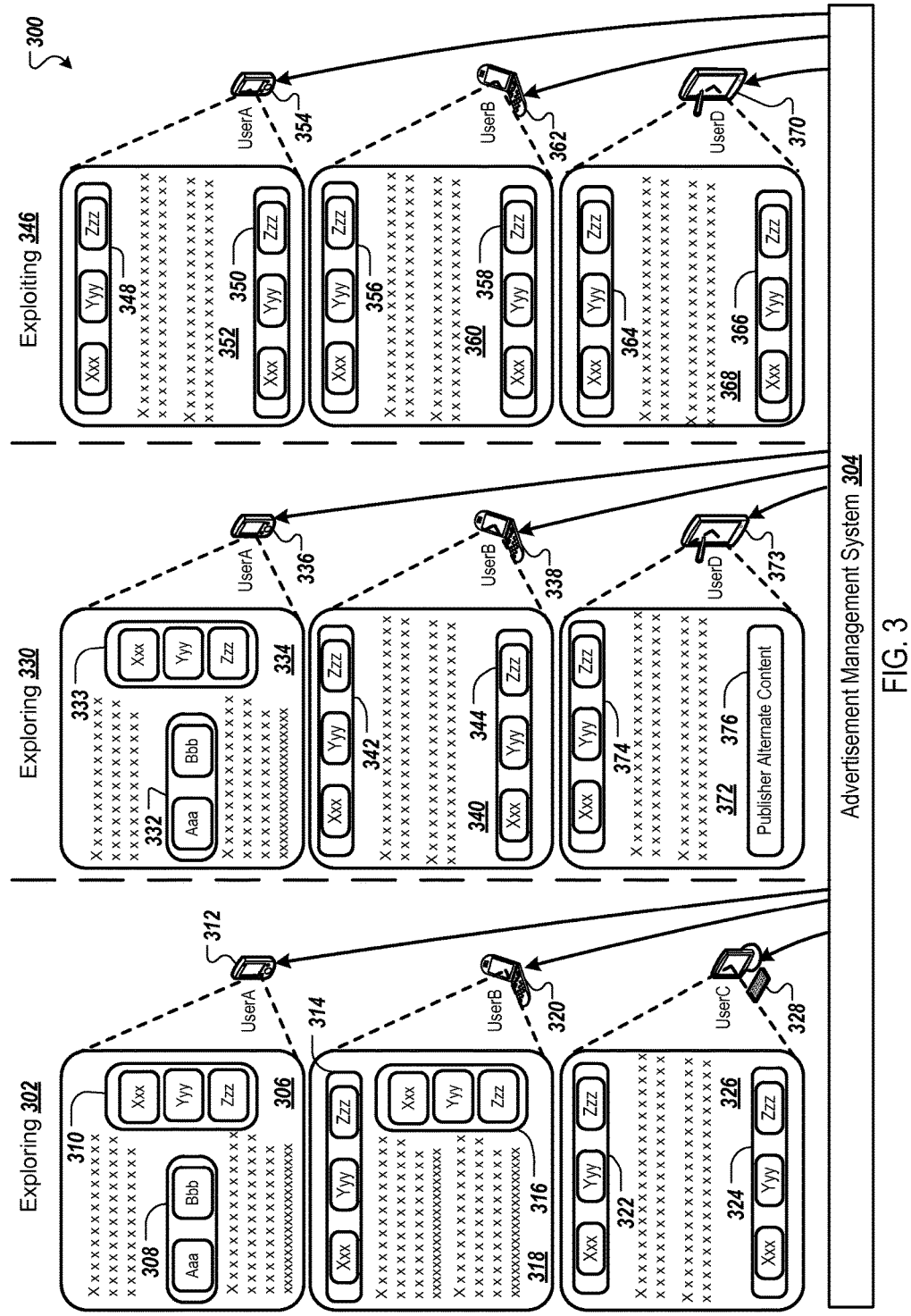

FIG. 3 is a block diagram of an example system 300 for optimizing the placement of advertisement blocks on a resource. In an exploring phase 302, an advertisement management system 304 can randomly select a particular set of advertisement blocks in response to advertisement requests for a resource or can select a set in proportion to a performance metric for each set of a plurality of sets of advertisement blocks. For example, as illustrated for a resource 306, a center advertisement block 308 and a right advertisement block 310 can be selected in response to an advertisement request received from a user device 312 for a user "A". Other examples include selection of a header advertisement block 314 and a right advertisement block 316 for a resource 318 in response to an advertisement request received from a user device 320 for a user "B" and selection of a header advertisement block 322 and a footer advertisement block 324 for a resource 326 in response to an advertisement request received from a user device 328 for a user "C".

Some or all advertisement requests can include a user identifier. For example, an advertisement request for the resource 306 can include a user identifier that is uniquely associated with the user "A". The advertisement requests received from the user devices 320 and 328 might not include user identifiers for the users "B" and "C", respectively. In response to receiving an advertisement request that includes the user identifier for the user "A", the advertisement management system 304 can select a set of advertisement blocks (e.g., a set that includes the center advertisement block 308 and the right advertisement block 310) and can associate the selected set with the user identifier for the user "A".

If a subsequent advertisement request is received that includes the user identifier for the user "A", the advertisement management system 304 can select the set of advertisement blocks previously associated with the user identifier for the user "A". For example, as shown in an exploring phase 330, the advertisement management system 304 has selected a header advertisement block 332 and a right advertisement block 333 (e.g., corresponding to the header advertisement block 314 and the right advertisement block 316) for a resource 334 in response to an advertisement request received from a user device 336 of the user "A".

Suppose the advertisement request for the user "B" for the resource 318 does not include a user identifier for the user "B". A subsequent advertisement request for the user "B", such as an advertisement request received from a user device 338 for a resource 340, can result in selection of a different set of advertisement blocks than the set of advertisement blocks selected for the resource 318. For example, the resource 340 includes a header advertisement block 342 and a footer advertisement block 344 (e.g., a different set than the set including the header advertisement block 314 and the right advertisement block 316).

As described above, the advertisement management system 304 can receive performance data corresponding to a presented set of advertisement blocks and can update a performance metric associated with the set. If the advertisement management system 304 determines that a performance metric for a particular set of advertisement blocks meets an exploitation threshold, the advertisement management system 306 can transition to an exploiting phase 346. For example, the advertisement management system 304 can determine that a performance metric for a set of advertisement blocks that includes a header advertisement block and a footer advertisement block (e.g., as shown for the resource 340) meets the exploitation threshold.

The advertisement management system 304 can, in response to determining that a performance metric for a set of advertisement blocks meets the exploitation threshold for a resource, select that set for substantially all subsequent advertisement requests for the resource. For example, the advertisement management system 304 can select a header advertisement block 348 and a footer advertisement block 350 for a resource 352 in response to an advertisement request received from a user device 354 of the user "A", select a header advertisement block 356 and a footer advertisement block 358 for a resource 360 in response to an advertisement request received from a user device 362 of the user "B", and select a header advertisement block 364 and a footer advertisement block 366 for a resource 368 in response to an advertisement request received from a user device 370 of a user "D".

In some implementations, a publisher can choose to have alternative content presented in a content area of a resource that corresponds to an unselected advertisement block. For example, for a resource 372 presented on a user device 373, a selected set of advertisement blocks can include a header advertisement block 374. A footer advertisement block (not shown) can be unselected. The publisher can choose to have alternative content presented in a footer content area 376.

Figure 4:
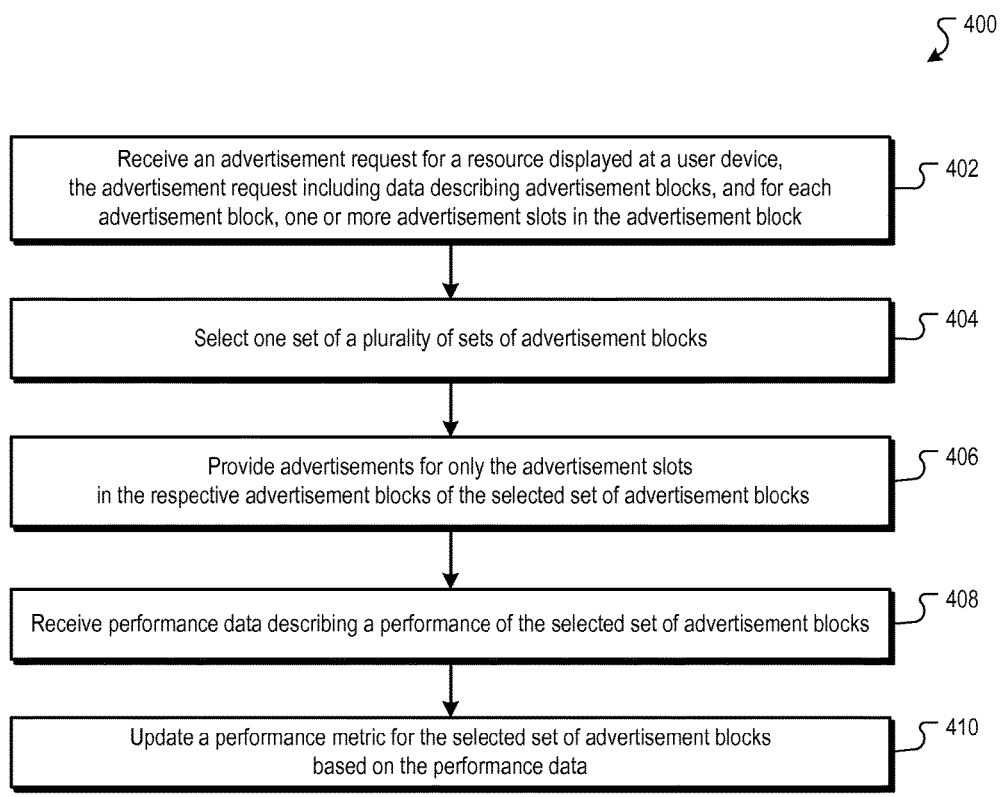
FIGS. 4 and 5 are flow diagrams of example processes for optimizing the placement of content blocks on a resource.

FIG. 4 is a flow diagram of an example process 400 for optimizing the placement of advertisement blocks on a resource. The process 400 can be implemented by the ad placement optimizer 118.

The ad placement optimizer 118 receives an advertisement request for a resource displayed at a user device (402). The resource can be, for example, a web page. The advertisement request can include data that describes one or more advertisement blocks that are available for display in the resource. Each advertisement block is an available location in which one or more advertisements may be displayed. Each advertisement block can include, for example, one or more advertisement slots, where an advertisement slot is a location in which an advertisement may be displayed. The request can include a user identifier that is uniquely associated with a user of the user device.

The ad placement optimizer 118 selects one set of a plurality of sets of advertisement blocks (404). Each set of advertisement blocks can specify a set of one or more advertisement blocks in the resource that are enabled. At least one of the sets of advertisement blocks is different from the other sets of advertisement blocks. A set of advertisement blocks can be selected randomly. In some implementations, a set that includes all but one of advertisement blocks is selected. In some implementations, a set that includes one advertisement block is selected. In some implementations, the ad placement optimizer 118 selects sets of advertisement blocks for association with user identifiers in proportion to a performance metric for each set of advertisement blocks.

The ad placement optimizer 118 provides advertisements for only the advertisement slots in the respective advertisement blocks of the selected set of advertisement blocks (406). The provided advertisements can be provided to the user device, for presentation with the resource on the user device.

The ad placement optimizer 118 receives performance data describing a performance of the selected set of advertisement blocks at the user device (408). For example, the performance data can indicate a number and/or a frequency of selections (e.g., clicks) of the provided advertisements in a particular time period. As another example, the performance data can indicate a number and/or frequency of conversions (e.g., purchases) that occurred in a particular time period as a result of presentation and/or selection of the provided advertisements in the selected set of advertisement blocks.

The ad placement optimizer 118 updates a performance metric for the selected set of advertisement blocks based on the performance data (410). For example, a click-through rate metric can be updated. As another example, a conversion rate metric can be updated.

Figure 5:
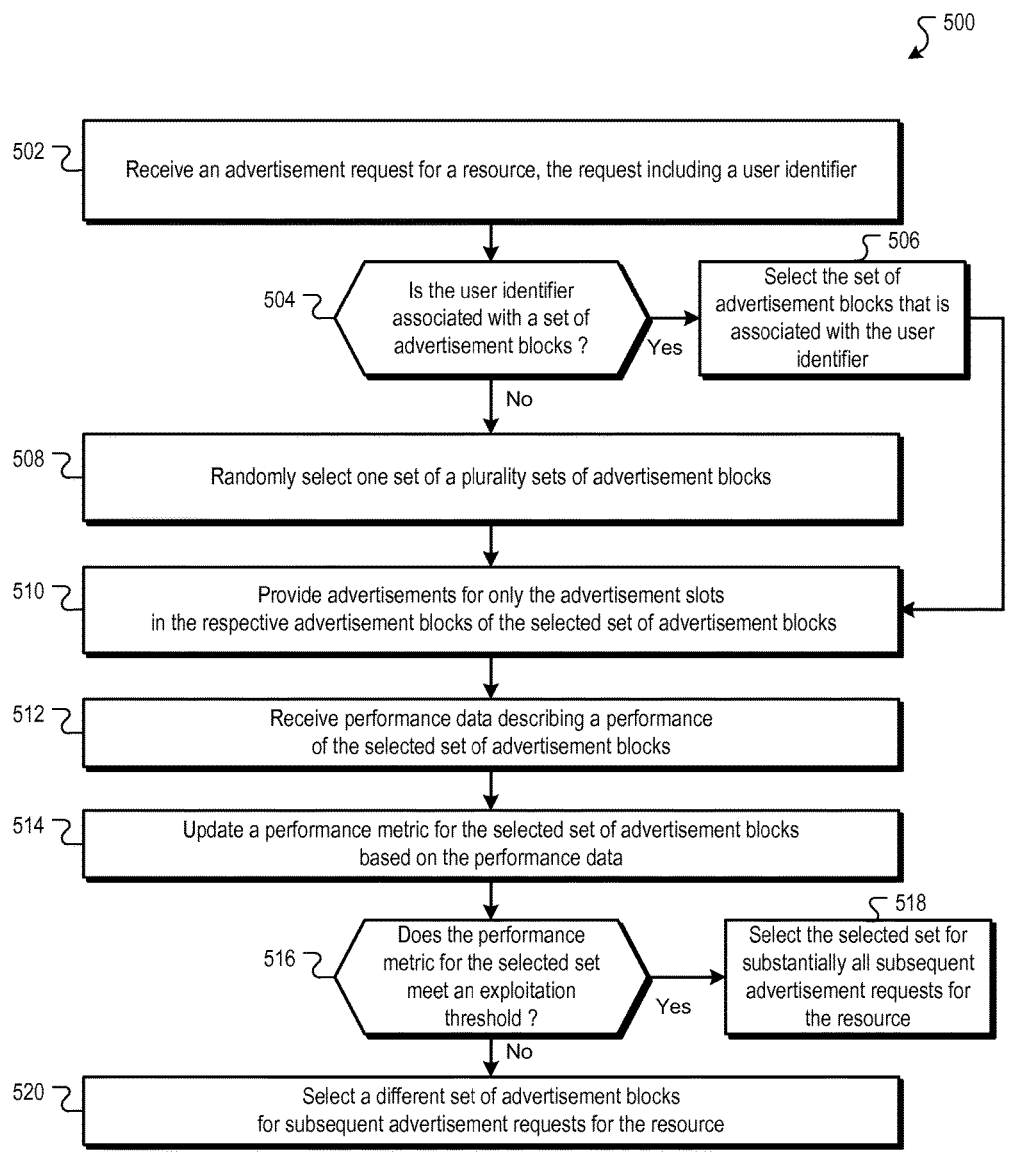

FIG. 5 is a flow diagram of an example process 500 for optimizing the placement of advertisement blocks on a resource. The process 500 can be implemented by the ad placement optimizer 118.

The ad placement optimizer 118 receives an advertisement request for a resource displayed at a user device, where the advertisement request includes a user identifier that is uniquely associated with a user of the user device (502). The resource can be, for example, a web page. The advertisement request can include data that describes one or more advertisement blocks that are available for display in the resource. Each advertisement block is an available location in which one or more advertisements may be displayed. Each advertisement block can include, for example, one or more advertisement slots, where an advertisement slot is a location in which an advertisement may be displayed.

The ad placement optimizer 118 determines whether the user identifier is associated with any one set of a plurality of sets of advertisement blocks (504). For example, the user identifier may have been associated with a set of advertisement blocks in response to a previous request for advertisements for the resource. The ad placement optimizer 118 can determine, for example, whether an entry for the user identifier exists in a user identifier-selected advertisement blocks mappings repository.

If the user identifier is associated with a set of advertisement blocks, the ad placement optimizer 118 selects the set of advertisement blocks that is associated with the user identifier (506). The set of advertisement blocks that is associated with the user identifier can be selected, for example, for maintaining a consistent user experience for the user.

If the user identifier is not associated with a set of advertisement blocks, the ad placement optimizer 118 randomly selects one set of the plurality of sets of advertisement blocks (508). In some implementations, a set of advertisement blocks can be selected using other approaches, such as selecting a set of advertisement blocks in proportion to a performance metric that is associated with each set of advertisement blocks.

The ad placement optimizer 118 provides advertisements for only the advertisement slots in the respective advertisement blocks of the selected set of advertisement blocks (510). The provided advertisements can be provided to the user device, for presentation with the resource on the user device.

The ad placement optimizer 118 receives performance data describing a performance of the selected set of advertisement blocks at the user device (512). For example, the performance data can indicate a number and/or a frequency of selections (e.g., clicks) of the provided advertisements in a particular time period. As another example, the performance data can indicate a number and/or frequency of conversions (e.g., purchases) that occurred in a particular time period as a result of presentation and/or selection of the provided advertisements in the selected set of advertisement blocks.

The ad placement optimizer 118 updates a performance metric for the selected set of advertisement blocks based on the performance data (514). For example, a click-through rate metric can be updated. As another example, a conversion rate metric can be updated.

The ad placement optimizer 118 determines whether the performance metric for the selected set of advertisement blocks is meets an exploitation threshold (516). For example, the ad placement optimizer 118 can compare a click-through rate metric or a conversion rate metric for the selected set to a predefined click-through rate threshold or a predefined conversion rate threshold, respectively. As another example, the ad placement optimizer 118 can compare the performance metric for the selected set to one or more performance metrics of one or more other sets in the plurality of sets of advertisement blocks. For example, the ad placement optimizer 118 can determine whether the performance metric for the selected set is greater, by at least a threshold amount, than the performance metric for each of the other sets in the plurality of sets of advertisement blocks.

If the performance metric for the selected set of advertisement blocks meets the exploitation threshold, the ad placement optimizer 118 selects the selected set of advertisement blocks for substantially all subsequent advertisement requests for the resource (518). In other words, the ad placement optimizer 118 can select the selected set of advertisement blocks for subsequent advertisement requests for the resource in response to determining that the selected set of advertisement blocks is a top performing set of advertisement blocks.

If the performance metric for the selected set of advertisement blocks does not meet the exploitation threshold, the ad placement optimizer 118 selects a different set of advertisement blocks for substantially all subsequent advertisement requests for the resource (518). In some implementations, the different set of advertisement blocks can be selected randomly. In other implementations, the different set of advertisement blocks is selected in proportion to a performance metric that is associated with each set of advertisement blocks. For example, a first advertisement block set with a performance metric greater than a performance metric for a second set of advertisement blocks is more likely to be selected than the second set. In variations of this implementation, the selection can be based on a predicted performance, e.g., a machine learned process that is trained to predict the performance of sets of advertising blocks for resources provides predicted performance scores, and the predicted scores are used to select the different set of advertisement blocks.

In some implementations, a request for advertisements for a resource does not include a description of advertisement blocks that are available for display in the resource. In such implementations, the ad placement optimizer 118 can determine available advertisement blocks, such as by analyzing log information that describes previous advertisement requests and presentations of advertisements for the resource. The ad placement optimizer 118 can determine a plurality of advertisement blocks that are available for display in the resource and can select a particular set of advertisement blocks from the determined plurality of advertisement blocks.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 6:
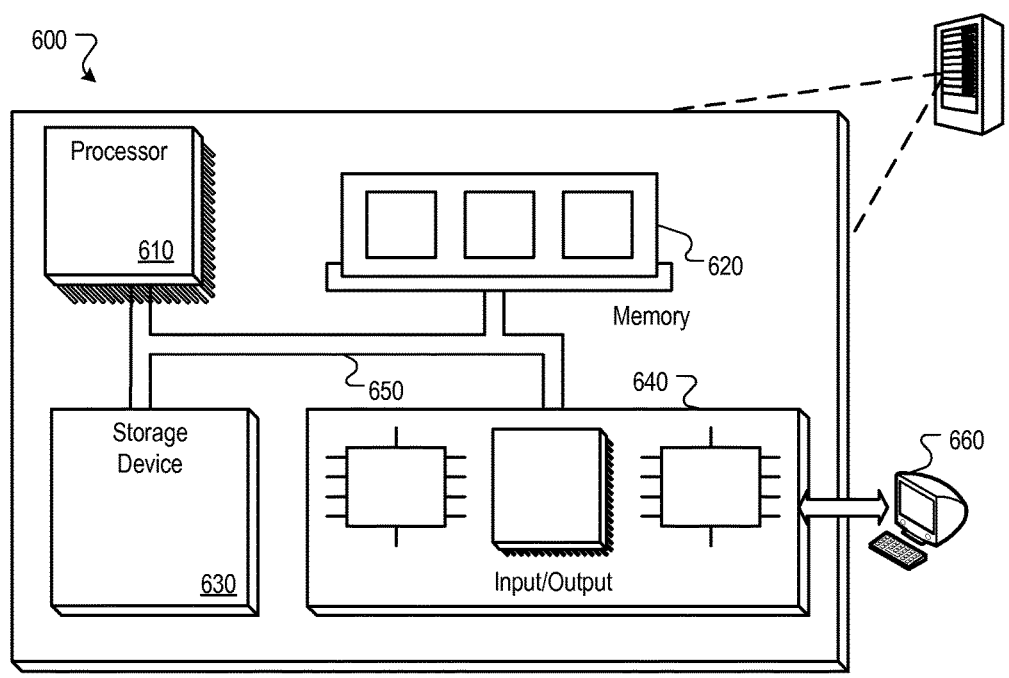
FIG. 6 is a block diagram of a data processing apparatus system.

An example of computing system in which the above-described techniques can be implemented is shown in FIG. 6, which shows a block diagram of a data processing apparatus system. The system 600 can be utilized to implement the systems and methods described herein. The architecture of the system 600 can, for example, be used to implement a computer client, a computer server, or some other computer device.

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer storage medium encoded with instructions that when executed by a data processing apparatus cause the data processing apparatus to perform operations comprising:
   receiving multiple, different advertisement requests for a resource displayed at a user device, each given advertisement request including data, specifying, for the resource, a same set of multiple, different advertisement slots that are available locations of the resource in which one or more advertisements provided in response to the given advertisement request are displayable;
   selecting, in response to the multiple, different advertisement requests, various, different combinations of advertisement slots, from among the multiple, different advertisement slots, with each combination including advertisement slots selected as eligible for a given advertisement request, and each combination including fewer than the number of available advertisement slots, wherein at least one of the combinations of advertisement slots is different from the other combinations of advertisement slots, and wherein a same combination of advertisement slots is presented to a same user over multiple different requests for the resource by the same user to maintain a consistent experience for the same user over multiple different presentations of the resource to the same user, the selecting including, for each given advertisement request:
      determining whether a user identifier included in the given advertisement request is stored in a mapping store that specifies a particular combination of advertisement slots that was previously used when the resource was previously presented to a user having the user identifier; and
      performing the selecting based on the determination, including:
         selecting the particular combination of advertisement slots to be presented on the resource when the user identifier is determined to be stored in the mapping store to maintain a consistent user interface for the user across multiple presentations of the resource to the user having the user identifier; and
      when the user identifier is determined to not be stored in the mapping store:
         selecting a different combination of advertisement slots to be presented on the resource; and
         storing the user identifier and an indication of the different combination of advertisement slots in the mapping store indicating that the different combination of advertisement slots has been selected for the user;
   for each given request, providing advertisements for only the combination of advertisement slots selected for the given request;
   for each given request, receiving performance data describing a performance at the user device of the combination of advertisement slots selected for the given request;
   for each given request, updating a performance metric for the combination of advertisement slots selected for the given request based on the performance data, the performance metric indicating a historical performance of the combination of advertisement slots selected for the given request; and
   adjusting an amount of traffic that is going to each different combination of advertisement slots based on the updated performance metric, including reducing a percentage of traffic that is provided lower performing combinations of advertisement slots.

2. The computer storage medium of claim 1, wherein a first advertisement request is a consolidated advertisement request that is a single request for all advertisement slots that are available to present advertisements provided in response to the first advertisement request and that is received from a user device on which the resource is displayed.

3. The computer storage medium of claim 1, wherein a given advertisement request is generated by a mapping of advertisement requests received for each instance of a display of the resource at a user device and associated with a unique identifier of the resource.

4. A system, comprising:
   a data processing apparatus; and
   a computer storage medium in data communication with the data processing apparatus and encoded with instructions that when executed by the data processing apparatus cause the data processing apparatus to perform operations comprising:
      receiving multiple, different advertisement requests for a resource displayed at a user device, each given advertisement request including data, specifying, for the resource, a same set of multiple, different advertisement slots that are available to present advertisements provided in response to the given advertisement request;
      selecting, in response to the multiple, different advertisement requests, various, different combinations of advertisement slots, from among the multiple, different advertisement slots, with each combination including advertisement slots selected as eligible for a given advertisement request, and each combination including fewer than the number of available advertisement slots, wherein at least one of the combinations of advertisement slots is different from the other combinations of advertisement slots, and wherein a same combination of advertisement slots is presented to a same user over multiple different requests for the resource by the same user to maintain a consistent experience for the same user over multiple different presentations of the resource to the same user, the selecting including, for each given advertisement request:

determining whether a user identifier included in the given advertisement request is stored in a mapping store that specifies a particular combination of advertisement slots that was previously used when the resource was previously presented to a user having the user identifier; and performing the selecting based on the determination, including:

selecting the particular combination of advertisement slots to be presented on the resource when the user identifier is determined to be stored in the mapping store to maintain a consistent user interface for the user across multiple presentations of the resource to the user having the user identifier; and when the user identifier is determined to not be stored in the mapping store:

selecting a different combination of advertisement slots to be presented on the resource; and storing the user identifier and an indication of the different combination of advertisement slots in the mapping store indicating that the different combination of advertisement slots has been selected for the user;

for each given request, providing advertisements for only the combination of advertisement slots selected for the given request;

for each given request, receiving performance data describing a performance at the user device of the combination of advertisement slots selected for the given request;

for each given request, updating a performance metric for the combination of advertisement slots selected for the given request based on the performance data, the performance metric indicating a historical performance of the combination of advertisement slots selected for the given request; and adjusting an amount of traffic that is going to each different combination of advertisement slots based on the updated performance metric, including reducing a percentage of traffic that is provided lower performing combinations of advertisement slots.

5. The system of claim 4, wherein a first advertisement request is a consolidated advertisement request that is a single request for all advertisement slots that are available to present advertisements provided in response to the given advertisement request and that is received from a user device on which the resource is displayed.

6. The system of claim 4, wherein a first advertisement request is generated by a mapping of advertisement requests received for each instance of a display of the resource at a user device and associated with a unique identifier of the resource.

7. A method performed by a data processing apparatus, comprising:

receiving multiple, different advertisement requests for a resource displayed at a user device, each given advertisement request including data, specifying, for the resource, a same set of multiple, different advertisement slots that are available to present advertisements provided in response to the given advertisement request;

selecting, in response to the multiple, different advertisement requests, various, different combinations of advertisement slots, from among the multiple, different advertisement slots, with each combination including advertisement slots selected as eligible for a given advertisement request, and each combination including fewer than the number of available advertisement slots, wherein at least one of the combinations of advertisement slots is different from the other combinations of advertisement slots, and wherein a same combination of advertisement slots is presented to a same user over multiple different requests for the resource by the same user to maintain a consistent experience for the same user over multiple different presentations of the resource to the same user, the selecting including, for each given advertisement request:

determining whether a user identifier included in the given advertisement request is stored in a mapping store that specifies a particular combination of advertisement slots that was previously used when the resource was previously presented to a user having the user identifier; and performing the selecting based on the determination, including:

selecting the particular combination of advertisement slots to be presented on the resource when the user identifier is determined to be stored in the mapping store to maintain a consistent user interface for the user across multiple presentations of the resource to the user having the user identifier; and when the user identifier is determined to not be stored in the mapping store:

selecting a different combination of advertisement slots to be presented on the resource; and storing the user identifier and an indication of the different combination of advertisement slots in the mapping store indicating that the different combination of advertisement slots has been selected for the user;

for each given request, providing advertisements for only the combination of advertisement slots selected for the given request;

for each given request, receiving performance data describing a performance at the user device of the combination of advertisement slots selected for the given request;

for each given request, updating a performance metric for the combination of advertisement slots selected for the given request based on the performance data, the performance metric indicating a historical performance of the combination of advertisement slots selected for the given request; and adjusting an amount of traffic that is going to each different combination of advertisement slots based on the updated performance metric, including reducing a percentage of traffic that is provided lower performing combinations of advertisement slots.

* * * * *